United States Patent
Gan et al.

(10) Patent No.: US 8,773,879 B2
(45) Date of Patent: Jul. 8, 2014

(54) BRIDGELESS PFC CIRCUIT SYSTEM HAVING CURRENT SENSING CIRCUIT AND CONTROLLING METHOD THEREOF

(75) Inventors: Hongjian Gan, Shanghai (CN);
Hongyuan Jin, Shanghai (CN);
Jianhong Zeng, Shanghai (CN)

(73) Assignee: Delta Electronics, Inc. (TW)

( * ) Notice: Subject to any disclaimer, the term of this patent is extended or adjusted under 35 U.S.C. 154(b) by 489 days.

(21) Appl. No.: 12/836,978

(22) Filed: Jul. 15, 2010

(65) Prior Publication Data
US 2011/0013436 A1    Jan. 20, 2011

(30) Foreign Application Priority Data

Jul. 15, 2009 (TW) .............................. 98124008 A

(51) Int. Cl.
*H02M 7/219* (2006.01)

(52) U.S. Cl.
USPC .............. 363/127; 363/89; 363/126; 323/207

(58) Field of Classification Search
USPC ........... 323/207; 363/81, 84, 88, 89, 125–127
See application file for complete search history.

(56) References Cited

U.S. PATENT DOCUMENTS

| | | | | |
|---|---|---|---|---|
| 6,646,848 B2 * | 11/2003 | Yoshida et al. | ............... | 361/93.5 |
| 2006/0220628 A1 * | 10/2006 | Soldano | ......................... | 323/282 |
| 2007/0058402 A1 * | 3/2007 | Shekhawat et al. | ............. | 363/89 |
| 2007/0279955 A1 * | 12/2007 | Liu et al. | ........................ | 363/125 |
| 2009/0230929 A1 * | 9/2009 | Sui et al. | ......................... | 323/207 |
| 2009/0303762 A1 * | 12/2009 | Jang et al. | ........................ | 363/61 |
| 2010/0259240 A1 * | 10/2010 | Cuk | ............................... | 323/299 |
| 2010/0259957 A1 * | 10/2010 | Jin et al. | ......................... | 363/126 |

* cited by examiner

*Primary Examiner* — Adolf Berhane
*Assistant Examiner* — Fred E Finch, III
(74) *Attorney, Agent, or Firm* — Allen, Dyer, Doppelt, Milbrath & Gilchrist, P.A.

(57) ABSTRACT

The configurations of a bridgeless PFC circuit system and a controlling method thereof are provided. The proposed system includes a bridgeless PFC circuit including a first bridge arm having a first and a second terminals and a first middle point, a second bridge arm having a first and a second terminals and a second middle point, and a bidirectional switch coupled between the first middle point and the second middle point, and an inductor coupled between the first middle point and an AC power source coupled to the second middle point, and a current sensing circuit including a first current transformer sensing a first current flowing through the bidirectional switch, which having a primary side winding coupled to the bidirectional switch and a first and a second secondary side windings, and a switching device coupled to the two secondary side windings.

18 Claims, 12 Drawing Sheets

US 8,773,879 B2

BRIDGELESS PFC CIRCUIT SYSTEM HAVING CURRENT SENSING CIRCUIT AND CONTROLLING METHOD THEREOF

FIELD OF THE INVENTION

The present invention relates to a current sensing circuit of a bridgeless power factor correction (PFC) circuit system and a controlling method thereof. More particularly, it relates to a current sensing circuit of an H-PFC circuit system and a controlling method thereof.

BACKGROUND OF THE INVENTION

In the conventional boost PFC circuits, the bridge rectifier loss becomes one of the main losses of the switching power. Following the requirements regarding the convention efficiency are improved, the bridgeless boost topology deriving from the conventional boost PFC circuit has gradually become the focus of the R&D. The bridgeless boost topology omits the bridge rectifier of the boost PFC circuit so that there're only two diodes in the operational loop, which reduces a diode conducting loss, and increases the efficiency. H-PFC circuit belongs to a kind of bridgeless boost topologies suitable for the medium power and large power applications (please refer to FIG. 1). In FIG. 1, the bridgeless PFC circuit includes an inductor L, four diodes D1-D4, a bidirectional switch comprising two switches Q1-Q2, and an output capacitor $C_B$, receives the AC input voltage Vin, and generates the DC output voltage Vo.

FIGS. 2(a)-2(b) are schematic circuit diagrams respectively showing the operational statuses of the positive half-cycle and the negative half-cycle of a period of operational frequency of the H-PFC circuit as shown in FIG. 1. The elements included in FIGS. 2(a)-2(b) are the same as those of FIG. 1, wherein the driving signals of the switches Q1 and Q2 have the same phase. In FIG. 2(a), L, D1, D4, Q 1, Q2 and $C_B$ form a boost circuit when the input voltage Vin is in its positive half-cycle, wherein D4 and Q2 are turned on continuously. The current flows through L, Q1 and Q2 and then returns when Q1 turns on. The current flows through L, D1, $C_B$, and D4 and then returns when Q1 turns off. In FIG. 2(b), L, D2, Q1, Q2, D3 and $C_B$ form another boost circuit when the input voltage Vin is in its negative half-cycle, wherein Q1 and D3 are turned on continuously. The current flows through L, Q1 and Q2 and then returns when Q2 turns on. The current flows through L, D3, $C_B$ and D2 and then returns when Q2 turns off. The currents flow through L, Q1 and Q2 are respectively in reverse directions when they are in the positive and the negative half-cycles. Due to that D3 and D4 clamp the AC power source to the output capacitor $C_B$ of the boost circuit, a common mode noise, which is the same as the conventional boost PFC circuit, could be obtained. Since the current flows through only two semiconductor elements during any time in a switch period, the conduction loss is decreased.

Keeping the drawbacks of the related arts in mind, and employing experiments and research full-heartily and persistently, the applicants finally conceived a bridgeless power factor correction circuit system having a current sensing circuit and a controlling method thereof.

SUMMARY OF THE INVENTION

It is therefore an object of the present invention to provide a bridgeless power factor correction circuit system having a current sensing circuit sensing a current flowing through switches and an inductor of the PFC circuit. The current sensing circuit has the advantages of having simpler electrical circuit configuration and method, lower cost and sensing accurately, can be used in occasions requiring either stronger anti-interference capabilities, or larger power, or higher requirements regarding current signal sampling.

According to the first aspect of the present invention, a bridgeless power factor correction (PFC) circuit system comprises a bridgeless PFC circuit comprising a first bridge arm having a first and a second terminals and a first middle point, a second bridge arm having a first and a second terminals and a second middle point, and a bidirectional switch coupled between the first middle point and the second middle point, and an inductor coupled between the first middle point and an AC power source, wherein the AC power source is coupled to the second middle point, and a current sensing circuit comprising a first current transformer (CT) for sensing a first current flowing through the bidirectional switch coupled to the bidirectional switch in series, which having a primary side winding coupled to the bidirectional switch and a first and a second secondary side windings, and a switching device coupled to the first and the second secondary side windings.

Preferably, the bridgeless PFC circuit is an H-PFC circuit which comprising: a first and a second input terminals, a first and a second output terminals, the first bridge arm with a first and a second switches and the first middle point, the second bridge arm with a third and a fourth switches and the second middle point; the bidirectional switch comprising a fifth and a sixth switches, each of the first to the sixth switches and the inductor has a first and a second terminals; wherein the first terminal of the first switch and the second terminal of the second switch are coupled to the first middle point, the second terminal of the first switch and the second terminal of the third switch are coupled to the first output terminal, the first terminal of the third switch and the second terminal of the fourth switch are coupled to the second middle point, the first terminal of the second switch and the first terminal of the fourth switch are coupled to the second output terminal, the second terminal of the fifth switch is coupled to the second terminal of the sixth switch, the primary side winding of the first CT is selected to be coupled to the first terminal of the fifth switch or the first terminal of the sixth switch, the first terminal of the inductor is coupled to the first input terminal, the second terminal of the inductor is coupled to the first middle point, and the second middle point is coupled to the second input terminal, and an output capacitor having a first terminal and a second terminal, wherein the first terminal of the output capacitor is coupled to the first output terminal and the second terminal of the output capacitor is coupled to the second output terminal.

Preferably, each of the first and the second secondary windings has a first and a second terminals, a first terminal of a first resistor is coupled to the first terminal of the first secondary winding, a second terminal of the first resistor is coupled to the second terminal of the first secondary winding and the first terminal of the second secondary winding, a first terminal of a second resistor is coupled to the first terminal of the second secondary winding, and a second terminal of the second resistor is coupled to the second terminal of the second secondary winding.

Preferably, the current sensing circuit further comprises a third resistor, a eighth and a ninth switches, the switching device comprises a seventh switch, each of the third resistor and the seventh to a ninth switches has a first and a second terminals, the first terminal of the first secondary winding is coupled to the second terminal of the eighth switch, the second terminal of the first secondary winding is coupled to the first terminal of the seventh switch, the second terminal of the second secondary winding is coupled to the second terminal of the ninth switch, the first terminal of the eighth switch is coupled to the first terminal of the ninth switch and the first terminal of the third resistor, and the second terminal of the seventh switch is coupled to the second terminal of the third resistor and is grounded.

Preferably, each of the first to the fourth and the eighth to the ninth switches is a diode having an anode being the first terminal and a cathode being the second terminal, the fifth to the seventh switches are MOSFETs, the first and the second currents are accumulated to form a current signal flowing through the inductor, and the current signal is a saw wave having a sinusoidal enveloping line.

Preferably, the current sensing circuit further comprises a second CT having a primary side winding coupled to the bridgeless PFC circuit for sensing a second current flowing through the inductor.

Preferably, the bridgeless PFC circuit is an H-PFC circuit which comprising: a first and a second input terminals, a first and a second output terminals, the first bridge arm with a first and a second switches and the first middle point, the second bridge arm with a third and a fourth switches and the second middle point; the bidirectional switch comprising a fifth and a sixth switches, each of the first to the sixth switches and the inductor has a first and a second terminals; wherein the first terminal of the first switch and the second terminal of the second switch are coupled to the first middle point, the second terminal of the first switch is coupled to the second terminal of the third switch, the first terminal of the third switch and the second terminal of the fourth switch are coupled to the second middle point, the first terminal of the second switch and the first terminal of the fourth switch are coupled to the second output terminal, the second terminal of the fifth switch is coupled to the second terminal of the sixth switch, the primary side winding of the first CT is selected to be coupled to the first terminal of the fifth switch or the first terminal of the sixth switch, the first terminal of the inductor is coupled to the first input terminal, the second terminal of the inductor is coupled to the first middle point, and the second middle point is coupled to the second input terminal; and an output capacitor having a first terminal and a second terminal, wherein the first terminal of the output capacitor is coupled to the first output terminal and the second terminal of the output capacitor is coupled to the second output terminal.

Preferably, the primary side winding of the second CT has a first terminal and a second terminal, the first terminal of the primary side winding of the second CT is coupled to the first terminal of the output capacitor and the first output terminal, the second terminal of the primary side winding of the second CT is coupled to the second terminal of the first switch and the second terminal of the third switch; and wherein each of the first and the second secondary windings of the first CT has a first and a second terminals, a first terminal of a first resistor is coupled to the first terminal of the first secondary winding of the first CT, a second terminal of the first resistor is coupled to the second terminal of the first secondary winding of the first CT and the first terminal of the second secondary winding of the first CT, a first terminal of the a resistor is coupled to the first terminal of the second secondary winding of the first CT, and a second terminal of the second resistor is coupled to the second terminal of the second secondary winding of the first CT, Preferably, the current sensing circuit further comprises a third resistor, a eighth and a ninth switches, the switching device comprises a seventh switch, each of the third resistor and the seventh to a ninth switches has a first and a second terminals, the first terminal of the first secondary winding of the first CT is coupled to the second terminal of the eighth switch, the second terminal of the first secondary winding is coupled to the first terminal of the seventh switch, the second terminal of the second secondary winding of the first CT is coupled to the second terminal of the ninth switch, the first terminal of the eighth switch is coupled to the first terminal of the ninth switch and the first terminal of the third resistor, the second terminal of the seventh switch is coupled to the second terminal of the third resistor and is grounded, the second CT further comprises a secondary side winding having a first and a second terminals, the first terminal of the secondary side winding of the second CT is coupled to the second terminal of the third resistor, the current sensing circuit further comprises a tenth switch having a first and a second terminals, the second terminal of the secondary side winding of the second CT is coupled to the second terminal e of the tenth switch, and the first terminal of the tenth switch is coupled to the first terminal of the third resistor.

Preferably, each of the first to the fourth and the eighth to the tenth switches is a diode having an anode being the first terminal and a cathode being the second terminal, the fifth to the seventh switches are MOSFETs, the first and the second currents are accumulated to form a current signal flowing through the inductor, and the current signal is a triangle wave having a sinusoidal enveloping line.

Preferably, the current sensing circuit further comprises a third resistor, a ninth and a tenth switches, the switching device comprising a seventh and a eighth switches, each of the third resistor and the seventh to the tenth switches has a first and a second terminals, the first terminal of the first secondary winding of the first CT is coupled to the first terminal of the ninth switch, the second terminal of the first secondary winding of the first CT is coupled to the second terminal of the third resistor, the second terminal of the second secondary winding of the first CT is coupled to the first terminal of the tenth switch, the second terminal of the ninth switch is coupled to the first terminal of the seventh switch, the second terminal of the tenth switch is coupled to the first terminal of the eighth switch, the second terminal of the seventh switch is coupled to the second terminal of the eighth switch and the first terminal of the third resistor, and the second terminal of the third resistor is grounded.

Preferably, each of the first to the fourth and the ninth to the tenth switches is a diode having an anode being the first terminal and a cathode being the second terminal, and the fifth to the eighth switches are MOSFETs.

According to the second aspect of the present invention, a controlling method for sensing current flowing through a bidirectional switch and an inductor of a bridgeless power factor correction (PFC) circuit system comprises the steps of (a) sensing a first current flowing through a first loop, wherein the first loop is formed from a first current transformer (CT), the bidirectional switch and the inductor connected in series when the bidirectional switch is turned on; and (b) sensing a second current flowing through the inductor when the bidirectional switch is turned off.

Preferably, the bridgeless power factor correction (PFC) circuit system further comprises a first to a fourth switches and an output capacitor, wherein the controlling method further comprises a step of (c) providing an AC input voltage at a positive half-cycle; and wherein sensing the second current flowing through the inductor of step (b) is accomplished by sensing a current flowing through a second loop, wherein the second loop is formed from the inductor, the first switch, the output capacitor and the fourth switch connected in series when the bidirectional switch is turned off.

Preferably, the second loop further comprises a second current transformer connected in series for sensing the second current flowing through the second loop.

Preferably, the controlling method comprises the steps of (a) providing an AC input voltage at a positive half-cycle; (b) sensing a first current flowing through a first loop, wherein the first loop is formed from a first current transformer (CT), the bidirectional switch and the inductor connected in series when the bidirectional switch is turned on; and (c) sensing a second current flowing through the inductor when the bidirectional switch is turned off; and wherein the step (b) comprises: (b1) providing a duty ratio of a secondary side of the first CT over a primary side of the first CT being n, wherein the third resistor has a resistance of R3; (b2) causing a sampling current flowing through the third resistor to be equal to the first current*(−n)*R3 when the bidirectional switch is turned on; and (b3) obtaining the first inductor current via the sampling current flowing through the third resistor.

Preferably, sensing the second current flowing through the inductor of step (c) is accomplished by sensing a current flowing through a second loop, wherein the second loop is formed from a second current transformer, the inductor, the first switch, the output capacitor and the fourth switch connected in series when the bidirectional switch is turned off, the first and the second currents are accumulated to form a current signal flowing through the inductor, and the current signal is a saw wave having a sinusoidal enveloping line.

Preferably, the controlling method comprises the steps of (a) providing an AC input voltage at a positive half-cycle; (b) sensing a first current flowing through a first loop, wherein the first loop is formed from a first current transformer (CT), the bidirectional switch and the inductor connected in series when the bidirectional switch is turned on; and (c) sensing a second current flowing through the inductor when the bidirectional switch is turned off; and wherein the step (b) comprises: (b1) providing a duty ratio of a secondary side of the first CT over a primary side of the first CT being n, wherein the third resistor has a resistance of R3; (b2) causing a sampling current flowing through the third resistor to be equal to the first current*(−n)*R3 when the bidirectional switch are turned on; and (b3) obtaining the first inductor current via the sampling current flowing through the third resistor.

Preferably, sensing the second current flowing through the inductor of step (c) is accomplished by sensing a current flowing through a second loop, wherein the second loop is formed from a second current transformer, the inductor, the first switch, the output capacitor and the fourth switch connected in series when the bidirectional switch is turned off, the first and the second currents are accumulated to form a current signal flowing through the inductor, and the current signal is a saw wave having a sinusoidal enveloping line.

The present invention may best be understood through the following descriptions with reference to the accompanying drawings, in which:

DETAILED DESCRIPTION OF THE PREFERRED EMBODIMENT

Figure 1:
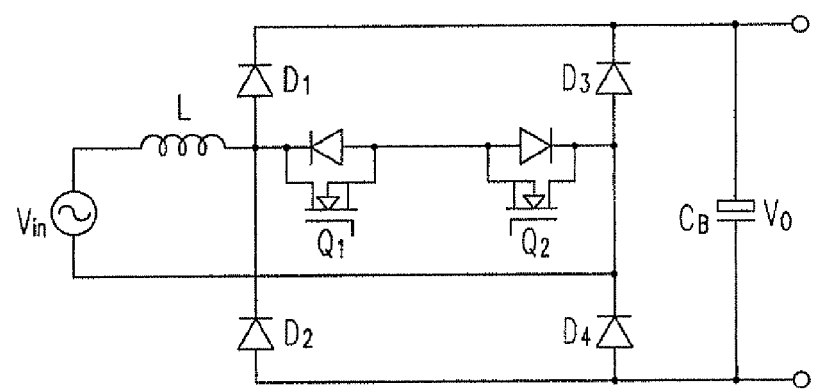
FIG. 1 shows a circuit diagram of an H-PFC circuit in the related art.
Figure 2A:
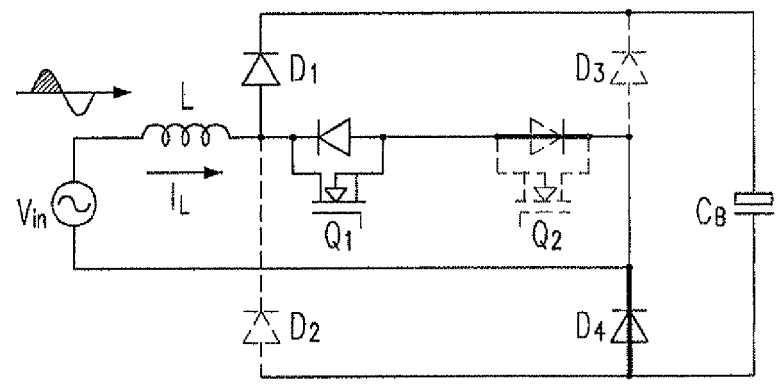
FIGS. 2(a)-2(b) are schematic circuit diagrams respectively showing the operational statuses of the positive half-cycle and the negative half-cycle of a period of operational frequency of the input voltage of the H-PFC circuit as shown in FIG. 1.
Figure 2B:
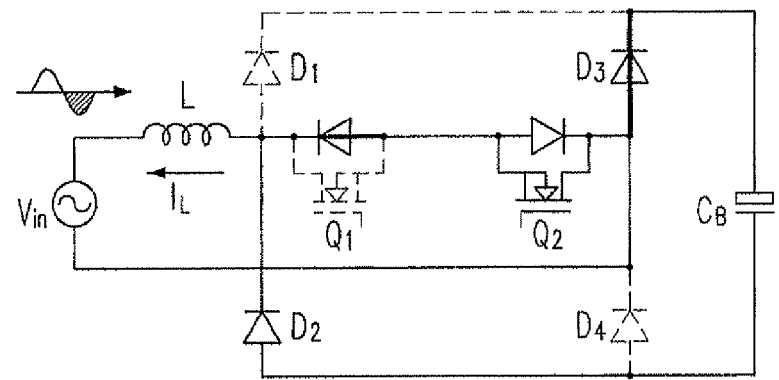
Figure 3A:
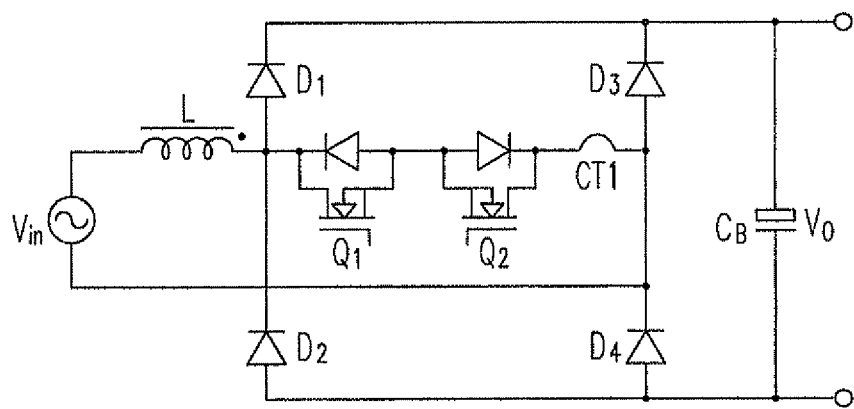
FIGS. 3(a)-3(b) are circuit diagrams respectively showing the main circuit and the current sensing circuit of the H-PFC circuit system according to the first preferred embodiment of the present invention.
Figure 3B:
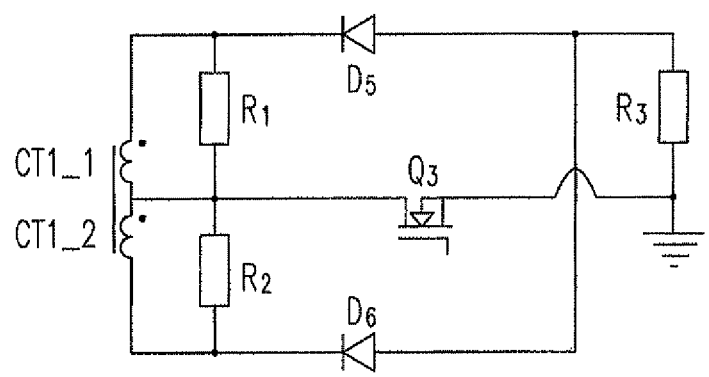
Figure 3C:
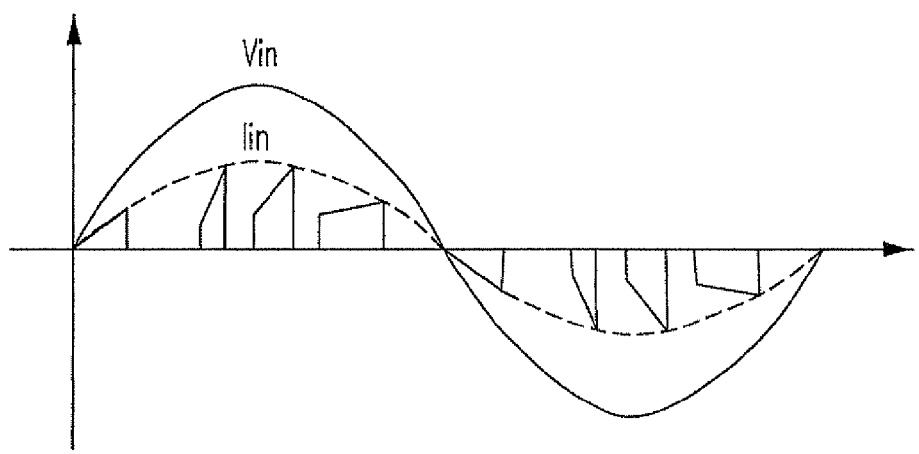
FIG. 3(c) is a waveform diagram of a saw wave having a sinusoidal enveloping line when a current sensing circuit as shown in FIG. 3(b) is used to sense a current flowing through Q1 and Q2 of the H-PFC circuit as shown in FIG. 3(a)
Figure 4:
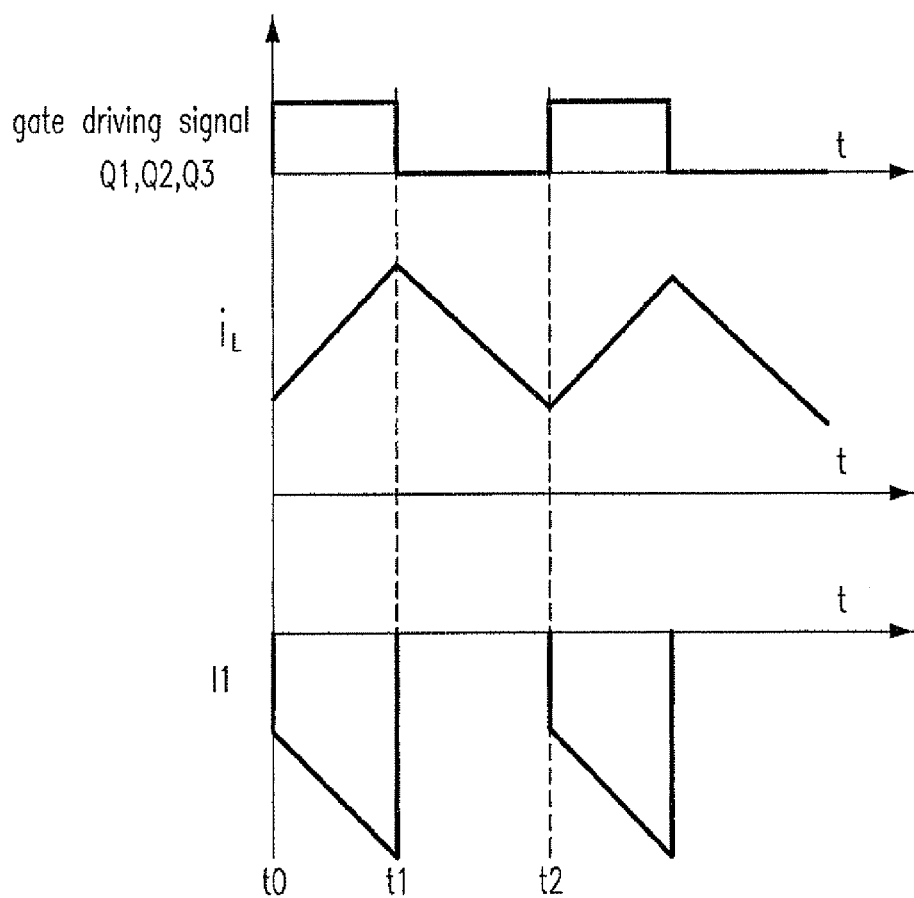
FIG. 4 is an operational waveform diagram of a positive half-cycle of a period of operational frequency of an AC input voltage of the main circuit and the current sensing circuit of H-PFC circuit according to the first preferred embodiment of the present invention.

FIGS. 3(a)-3(b) are circuit diagrams respectively showing the main circuit and the current sensing circuit of the H-PFC circuit system according to the first preferred embodiment of the present invention. The main circuit employing this current sensing circuit is shown in FIG. 3(a). The difference between FIG. 3(a) and FIG. 1 is that a current transformer (CT) CT1 is added. This first preferred embodiment employs a current sensing circuit as shown in FIG. 3(b) to sense a current flowing through the bidirectional switch comprising two switches Q1 and Q2 of the H-PFC circuit as shown in FIG. 3(a). In other embodiments, other types of bidirectional switch which can be controlled to achieve bidirectional switching function may be used, for example, a bridge type bidirectional switch. The current sensing circuit as shown in FIG. 3(b) is employed to sense a saw wave having a sinusoidal enveloping line, and the saw wave is shown in FIG. 3(c). Except for the first secondary winding CT1_1 and the second secondary winding CT1_2 of the secondary side of the CT CT1, this current sensing circuit further includes R1, R2, D5, D6, R3 and Q3, and the driving signal of Q3 is the same as the driving signals of Q1 and Q2. FIG. 4 shows an operational waveform diagram of a positive half-cycle of a period of operational frequency of an AC input voltage of the main circuit and the current sensing circuit of H-PFC circuit according to the first preferred embodiment of the present invention. The gate driving signals of Q1, Q2 and Q3 are the waveforms of gate driving signals of the switches Q1, Q2 and Q3 (they are all MOSFETs or IGBTs). iL is the current flowing through the inductor, and I1 is the current flowing through switches Q1 and Q2, i.e. the current flowing through the primary side of CT1.

Figure 5A:
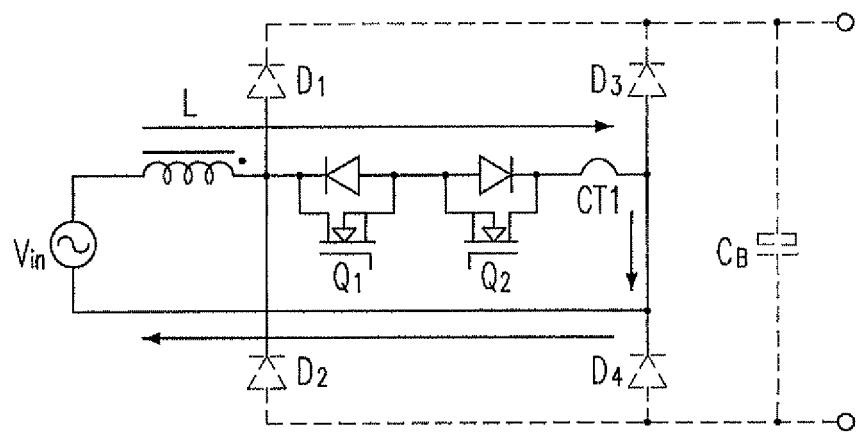
FIGS. 5(a) and 5(b) are respectively showing schematic circuit diagrams of the main circuit and the current sensing circuit as shown in FIG. 3(a) in a first operational stage of positive half-cycle of a period of operational frequency of an AC input voltage.
Figure 5B:
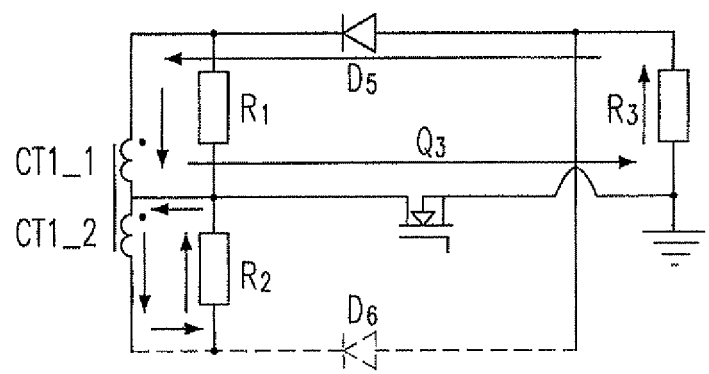
Figure 5C:
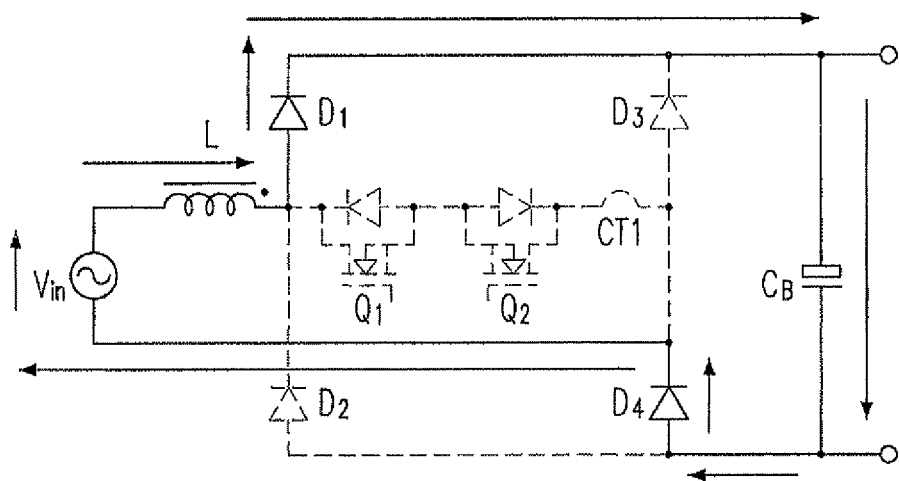
FIGS. 5(c) and 5(d) are respectively showing schematic circuit diagrams of the main circuit and the current sensing circuit as shown in FIG. 3(b) in a second operational stage of positive half-cycle of a period of operational frequency of an AC input voltage.
Figure 5D:
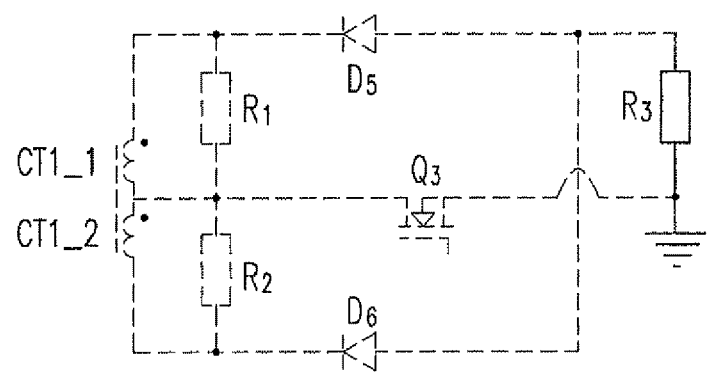

FIGS. 5(a) and 5(b) respectively show schematic circuit diagrams of the main circuit and the current sensing circuit as shown in FIG. 3(a) and FIG. 3(b) in a first operational stage of positive half-cycle of a period of operational frequency of the input voltage. FIGS. 5(c) and 5(d) are respectively showing schematic circuit diagrams of the main circuit and the current sensing circuit as shown in FIG. 3(a) and FIG. 3(b) in a second operational stage of positive half-cycle of a period of operational frequency of an AC input voltage. FIGS. 5(a) to 5(d) show concrete analyses of operational statuses of circuits as shown in FIGS. 3(a) and 3(b). Analyses of operational statuses of circuits in the negative half-cycle of the input voltage etc. are similar to those of the positive half-cycle of the input voltage. n is the turns ratio of the secondary side over the primary side of the CT1 (the primary side of the CT is located on the main circuit side, and the secondary side is located on the sensing circuit side).

As shown in FIGS. 5(a)-5(b), in the first operational stage of the circuit, three switches Q1, Q2 and Q3 are turned on simultaneously, the current flows through L, Q1, Q2 and CT1, and then returns. During this period of time, the primary side current of CT1 is $I_L$, the secondary side current of CT1 is $nI_L$, the secondary side current of CT1_1 flows through Q3, R3 and D5 and then returns, the secondary side current of CT1_2 flows through R2 and then returns, therefore, the voltage across the sampling resistor R3 is $-nI_LR3$.

As shown in FIGS. 5(c)-5(d), it is the second operational stage of the H-PFC circuit. After switches Q1, Q2 and Q3 are turned off simultaneously, the current flows through L, D1, CB and D4, and then returns. During this period of time, due to Q3 is turned off, the secondary windings of CT1: the first secondary winding CT1_1 and the second secondary winding CT1_2 are separated from the sampling resistor R3, and CT1 has no effect in the circuit. Thus, the current flows through the main power elements Q1 and Q2 could be sensed, and could be accurately sensed without the phase detection. This method uses just one CT1 and has relatively simpler configuration of circuit.

Figure 6A:
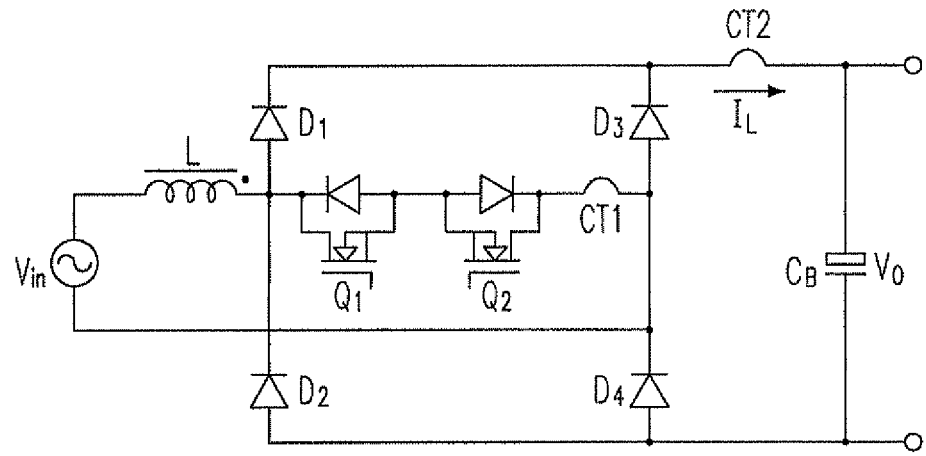
FIGS. 6(a)-6(b) are circuit diagrams respectively showing the main circuit and the current sensing circuit of the H-PFC circuit system according to the second preferred embodiment of the present invention.
Figure 6B:
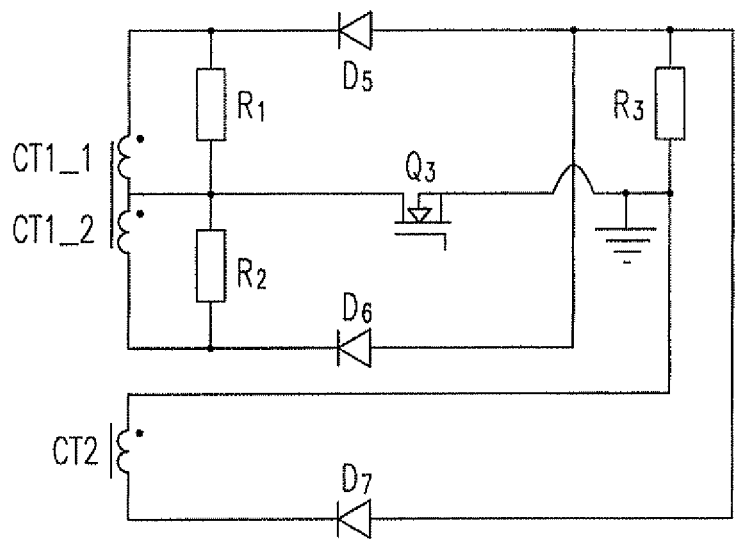
Figure 6C:
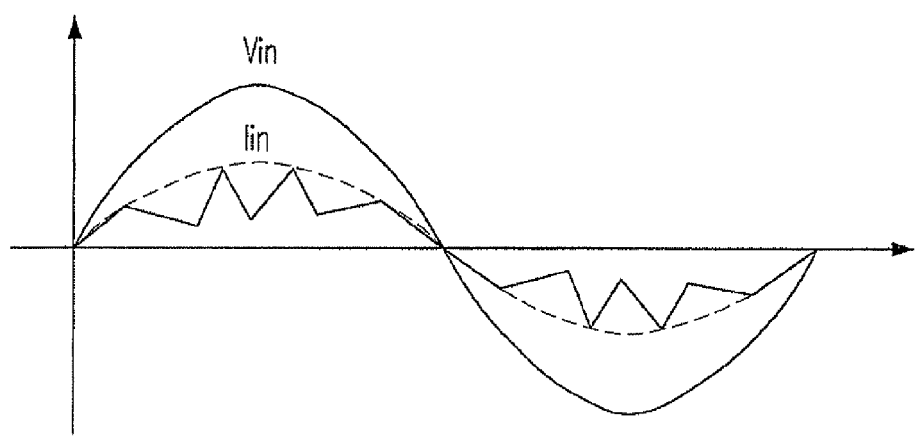
FIG. 6(c) is a waveform diagram of a triangle wave having a sinusoidal enveloping line when a current sensing circuit as shown in FIG. 6(b) is used to sense a current flowing through Q1 and Q2 of the H-PFC circuit as shown in FIG. 6(a)

For obtaining the waveforms of current flowing through the inductor, another CT (CT2) is required to be added. CT2 forms another current sampling circuit between the rectifying bridge D1, D2, D3 and D4, and the capacitor $C_B$ as shown in FIG. 6(b), which is the second preferred embodiment of the present invention, and the main circuit of which is shown in FIG. 6(a). This current signal sampling circuit samples the triangle wave having a sinusoidal enveloping line, and the triangle wave current signal is shown in FIG. 6(c). When switches Q1, Q2 and Q3 are turned on simultaneously as shown in FIGS. 5(a)-5(b), it is the same as the first preferred embodiment. After the MOSFETs Q1, Q2 and Q3 are turned off simultaneously, the current flows through L, D1, CT2, CB and D4, and then returns. During this period of time, the current of CT2 is $I_L$, the current of secondary side of CT2 is $-nI_L$, and the current flowing through the secondary side of CT2 flows through R3 and D7 and then returns, thus the voltage across the sampling resistor is $-nI_LR3$ as shown in FIG. 6(b). The current signals during the two time periods, wherein switches Q1, Q2 and Q3 are turned on and turned off respectively, are accumulated to form the current signal flowing through the inductor. This way, the current flowing through the inductor could be sensed by only using the two CTs CT1 and CT2.

Figure 7:
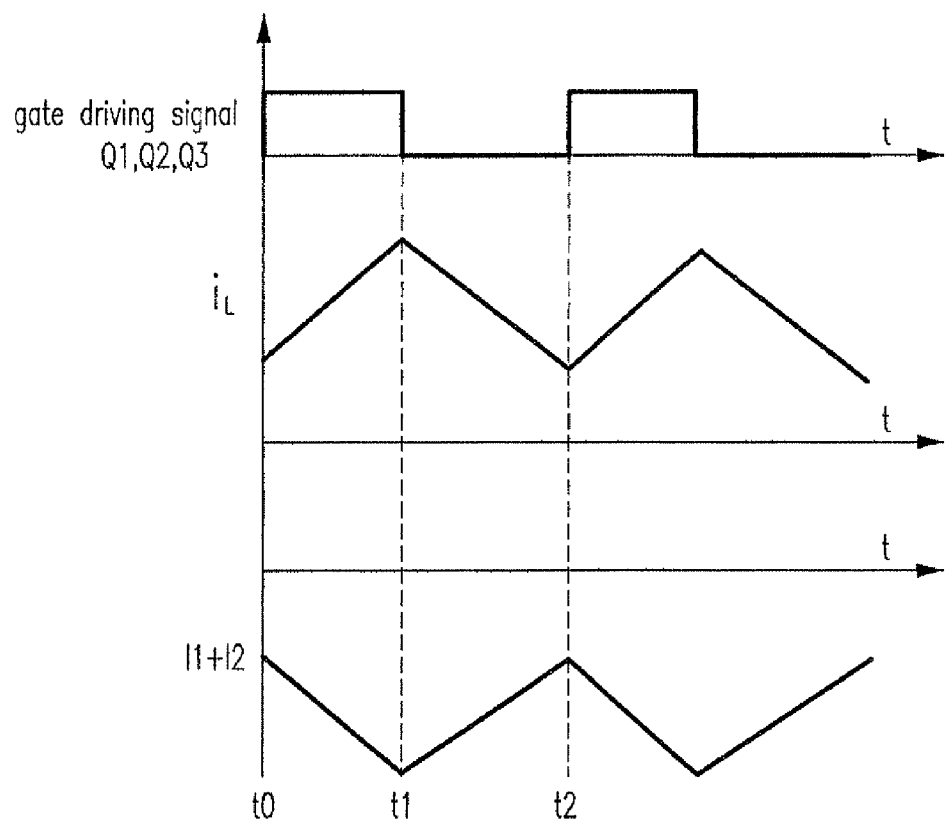
FIG. 7 is an operational waveform diagram of a positive half-cycle of a period of operational frequency of an AC input voltage of the main circuit and the current sensing circuit of H-PFC circuit according to the second preferred embodiment of the present invention.
Figure 8A:
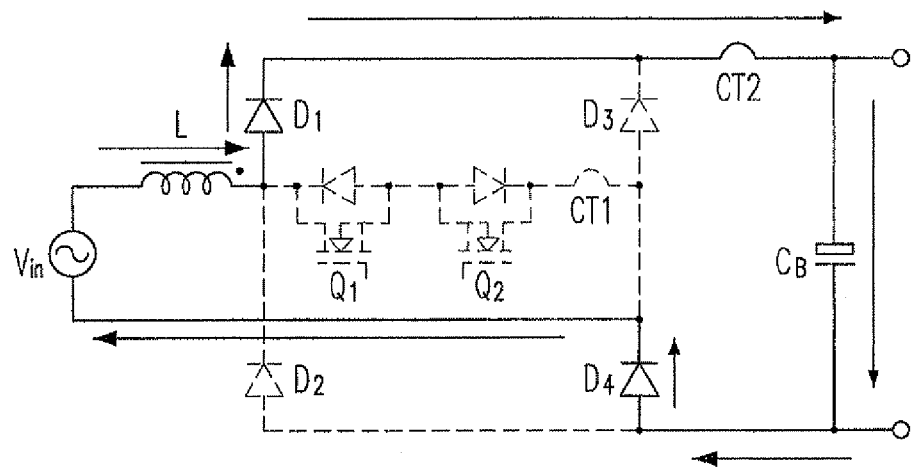
FIGS. 8(a)-8(b) are respectively showing schematic circuit diagrams of the main circuit and the current sensing circuit of H-PFC circuit in a second operational stage of positive half-cycle of a period of operational frequency of an AC input voltage according to the second preferred embodiment.
Figure 8B:
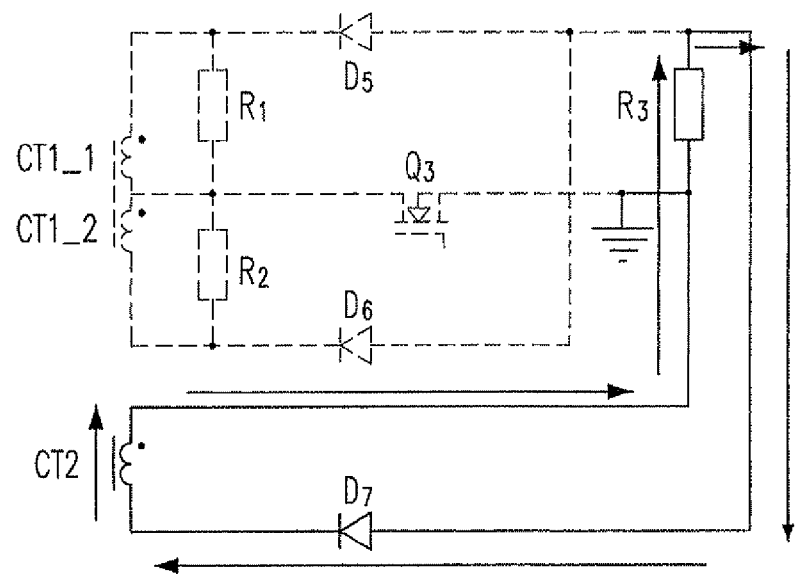

FIG. 7 shows an operational waveform diagram of a positive half-cycle of a period of operational frequency of an AC input voltage of the main circuit and the current sensing circuit of H-PFC circuit according to the second preferred embodiment of the present invention. FIGS. 8(a)-8(b) are respectively showing schematic circuit diagrams including current paths of the main circuit and the current sensing circuit of H-PFC circuit in a second operational stage of positive half-cycle of a period of operational frequency of an AC input voltage according to the second preferred embodiment. In FIG. 7, I1+I2 is the waveform showing the accumulated current signals during the two time periods, wherein switches Q1, Q2 and Q3 are turned on and turned off respectively.

Figure 9:
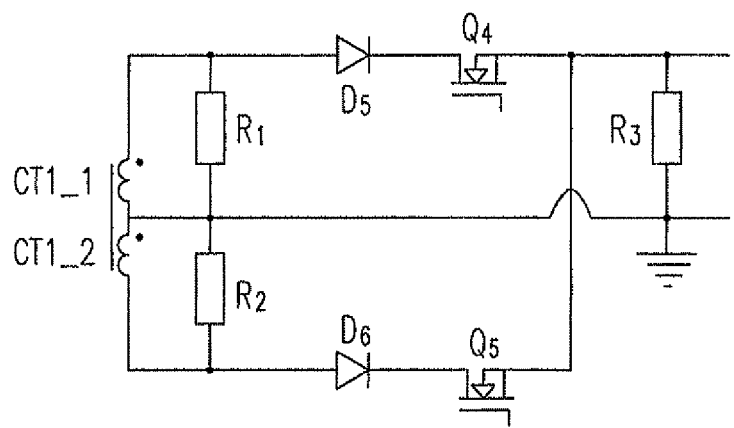
FIG. 9 is a circuit diagram of the current sensing circuit of the H-PFC circuit system according to the third preferred embodiment of the present invention.

The switch Q3 as shown in FIG. 3(b) of the present invention could be replaced by two switches Q4 and Q5 as configured and shown in FIG. 9. FIG. 9 is a circuit diagram of the current sensing circuit of the H-PFC circuit system according to the third preferred embodiment of the present invention, wherein the anode of the diode D5 is coupled to the first terminal of the resistor R1, the cathode of the diode D5 is coupled to the first terminal of the switch Q4, the anode of the diode D6 is coupled to the second terminal of the resistor R2, the cathode of the diode D6 is coupled to the first terminal of the switch Q5, the second terminals of Q4 and Q5 are both coupled to the first terminal of the resistor R3, and these are the differences between FIG. 9 and FIG. 3(b). In this way, the anti-interference capabilities are much stronger, can be used in occasions requiring either larger power, or higher requirements regarding current signal sampling (e.g., digital control), but phase detection is required.

The present invention employs the above-mentioned current sensing circuits, there is no need to increase the control circuit, the triangle wave and saw wave both having the sinusoidal enveloping lines can be sampled. This method is simple, has low cost and is capable of sensing accurately.

According to the aforementioned descriptions, the present invention provides a bridgeless power factor correction circuit system having a current sensing circuit sensing a current flowing through switches and an inductor of the PFC circuit. The current sensing circuit has the advantages of having simpler electrical circuit configuration and method, having lower cost and being capable of sensing accurately, can be used in occasions either requiring stronger anti-interference capabilities, or requiring larger power, or having higher requirements regarding current signal sampling.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A bridgeless power factor correction (PFC) circuit system, comprising:

a bridgeless PFC circuit, comprising:
  a first switch and a second switch coupled to the first switch at a first middle point;
  a third switch and a fourth switch coupled to the third switch at a second middle point; and
  a bidirectional switch coupled between the first middle point and the second middle point;
an inductor coupled between the first middle point and an AC power source, wherein the AC power source is coupled to the second middle point; and
a current sensing circuit comprising:
  a first current transformer (CT) for sensing a first current flowing through the bidirectional switch coupled to the bidirectional switch in series, which having only one primary side winding coupled to the bidirectional switch between the first middle point and the second middle point, and a first and a second secondary side windings; and a switching device coupled to the first and the second secondary side windings.

2. A bridgeless power factor correction (PFC) circuit system according to claim 1, wherein the bridgeless PFC circuit is an H-PFC circuit which comprising:
  a first and a second input terminals, a first and a second output terminals; the bidirectional switch comprising a fifth and a sixth switches, each of the first to the sixth switches and the inductor has a first and a second terminals; wherein the first terminal of the first switch and the second terminal of the second switch are coupled to the first middle point, the second terminal of the first switch and the second terminal of the third switch are coupled to the first output terminal, the first terminal of the third switch and the second terminal of the fourth switch are coupled to the second middle point, the first terminal of the second switch and the first terminal of the fourth switch are coupled to the second output terminal, the second terminal of the fifth switch is coupled to the second terminal of the sixth switch, the primary side winding of the first CT is selected to be coupled to the first terminal of the fifth switch or the first terminal of the sixth switch, the first terminal of the inductor is coupled to the first input terminal, the second terminal of the inductor is coupled to the first middle point, and the second middle point is coupled to the second input terminal; and
  an output capacitor having a first terminal and a second terminal, the first terminal of the output capacitor is coupled to the first output terminal and the second terminal of the output capacitor is coupled to the second output terminal.

3. A bridgeless power factor correction (PFC) circuit system according to claim 2, wherein each of the first and the second secondary windings has a first and a second terminals, a first terminal of a first resistor is coupled to the first terminal of the first secondary winding, a second terminal of the first resistor is coupled to the second terminal of the first secondary winding and the first terminal of the second secondary winding, a first terminal of a second resistor is coupled to the first terminal of the second secondary winding, a second terminal of the second resistor is coupled to the second terminal of the second secondary winding and the switching device comprises a seventh switch.

4. A bridgeless power factor correction (PFC) circuit system according to claim 3, wherein the current sensing circuit further comprises a third resistor, a eighth and a ninth switches, each of the third resistor and the seventh to a ninth switches has a first and a second terminals, the first terminal of the first secondary winding is coupled to the second terminal of the eighth switch, the second terminal of the first secondary winding is coupled to the first terminal of the seventh switch, the second terminal of the second secondary winding is coupled to the second terminal of the ninth switch, the first terminal of the eighth switch is coupled to the first terminal of the ninth switch and the first terminal of the third resistor, and the second terminal of the seventh switch is coupled to the second terminal of the third resistor and is grounded.

5. A bridgeless power factor correction (PFC) circuit system according to claim 4, wherein each of the first to the fourth and the eighth to the ninth switches is a diode having an anode being the first terminal and a cathode being the second terminal, the fifth to the seventh switches are MOSFETs, the first current includes a saw wave having a sinusoidal enveloping line.

6. A bridgeless power factor correction (PFC) circuit system according to claim 5, wherein the current sensing circuit further comprises a second CT having a primary side winding coupled to the bridgeless PFC circuit for sensing a second current flowing through the inductor, the first and the second currents are accumulated to form a current signal flowing through the inductor, and the current signal is a triangle wave having a sinusoidal enveloping line.

7. A bridgeless power factor correction (PFC) circuit system according to claim 6, wherein the primary side winding of the second CT has a first terminal and a second terminal, the first terminal of the primary side winding of the second CT is coupled to the first terminal of the output capacitor and the first output terminal, and the second terminal of the primary side winding of the second CT is coupled to the second terminal of the first switch and the second terminal of the third switch.

8. A bridgeless power factor correction (PFC) circuit system according to claim 7, wherein the second CT further comprises a secondary side winding having a first and a second terminals, the first terminal of the secondary side winding of the second CT is coupled to the second terminal of the third resistor, the current sensing circuit further comprises a tenth switch having a first and a second terminals, the second terminal of the secondary side winding of the second CT is coupled to the second terminal of the tenth switch, and the first terminal of the tenth switch is coupled to the first terminal of the third resistor.

9. A bridgeless power factor correction (PFC) circuit system according to claim 8, wherein each of the first to the fourth and the eighth to the tenth switches is a diode having an anode being the first terminal and a cathode being the second terminal, the fifth to the seventh switches are MOSFETs.

10. A controlling method for a bridgeless power factor correction (PFC) circuit system as claimed in claim 8, comprising the steps of:
  (a) providing an AC input voltage at a positive half-cycle;
  (b) sensing a first current flowing through a first loop, wherein the first loop is formed from a the first current transformer (CT), the bidirectional switch and the inductor connected in series when the bidirectional switch is turned on; and
  (c) sensing a second current flowing through the inductor when the bidirectional switch is turned off; and
  wherein the step (b) comprises:
  (b1) providing a duty ratio of a secondary side of the first CT over a primary side of the first CT being n, wherein the third resistor has a resistance of R3;
  (b2) causing a sampling current flowing through the third resistor to be equal to the first current*(−n)*R3 when the bidirectional switch are turned on; and (b3) obtaining the first current via the sampling current flowing through the third resistor.

11. A method according to claim 10, wherein sensing the second current flowing through the inductor of step (c) is accomplished by sensing a current flowing through a second loop, wherein the second loop is formed from a second current transformer, the inductor, the first switch, the output capacitor and the fourth switch connected in series when the bidirectional switch is turned off, the first current includes a saw wave having a sinusoidal enveloping line, the first and the second currents are accumulated to form a current signal flowing through the inductor, and the current signal is a triangle wave having a sinusoidal enveloping line.

12. A controlling method for a bridgeless power factor correction (PFC) circuit system as claimed in claim 4, comprising the steps of:
(a) providing an AC input voltage at a positive half-cycle;
(b) sensing a first current flowing through a first loop, wherein the first loop is formed from the first current transformer (CT), the bidirectional switch and the inductor connected in series when the bidirectional switch is turned on; and
(c) sensing a second current flowing through the inductor when the bidirectional switch is turned off; and
wherein the step (b) comprises:
(b1) providing a duty ratio of a secondary side of the first CT over a primary side of the first CT being n, wherein the third resistor has a resistance of R3;
(b2) causing a sampling current flowing through the third resistor to be equal to the first current*(−n)*R3 when the bidirectional switch is turned on; and
(b3) obtaining the first current via the sampling current flowing through the third resistor.

13. A method according to claim 12, wherein sensing the second current flowing through the inductor of step (c) is accomplished by sensing a current flowing through a second loop, wherein the second loop is formed from a second current transformer, the inductor, the first switch, the output capacitor and the fourth switch connected in series when the bidirectional switch is turned off, the first current includes a saw wave having a sinusoidal enveloping line, the first and the second currents are accumulated to form a current signal flowing through the inductor, and the current signal is a triangle wave having a sinusoidal enveloping line.

14. A bridgeless power factor correction (PFC) circuit system according to claim 3, wherein the current sensing circuit further comprises a third resistor, a ninth and a tenth switches, the switching device comprising a seventh and a eighth switches, each of the third resistor and the seventh to the tenth switches has a first and a second terminals, the first terminal of the first secondary winding of the first CT is coupled to the first terminal of the ninth switch, the second terminal of the first secondary winding of the first CT is coupled to the second terminal of the third resistor, the second terminal of the second secondary winding of the first CT is coupled to the first terminal of the tenth switch, the second terminal of the ninth switch is coupled to the first terminal of the seventh switch, the second terminal of the tenth switch is coupled to the first terminal of the eighth switch, the second terminal of the seventh switch is coupled to the second terminal of the eighth switch and the first terminal of the third resistor, and the second terminal of the third resistor is grounded.

15. A bridgeless power factor correction (PFC) circuit system according to claim 14, wherein each of the first to the fourth and the ninth to the tenth switches is a diode having an anode being the first terminal and a cathode being the second terminal, and the fifth to the eighth switches are MOSFETs.

16. A controlling method for sensing current flowing through a bidirectional switch and an inductor of a bridgeless power factor correction (PFC) circuit system comprising a first switch and a second switch coupled to the first switch at a first middle point, a third switch and a fourth switch coupled to the third switch at a second middle point, and a bidirectional switch coupled between the first middle point and the second middle point, the controlling method comprising the steps of:
(a) sensing a first current flowing through a first loop, wherein the first loop is formed from a first current transformer (CT) having only one primary winding coupled to the bidirectional switch between the first middle point and the second middle point, the bidirectional switch and the inductor connected in series when the bidirectional switch is turned on; and
(b) sensing a second current flowing through the inductor when the bidirectional switch is turned off.

17. A controlling method according to claim 16, wherein the bridgeless power factor correction (PFC) circuit system further comprises a first to a fourth switches and an output capacitor, wherein the controlling method further comprises a step of:
(c) providing an AC input voltage at a positive half-cycle; and
wherein sensing the second current flowing through the inductor of step (b) is accomplished by sensing a current flowing through a second loop, wherein the second loop is formed from the inductor, the first switch, the output capacitor and the fourth switch connected in series when the bidirectional switch is turned off.

18. A controlling method according to claim 17, wherein the second loop further comprises a second current transformer connected in series with the first switch and the output capacitor for sensing the second current flowing through the second loop.

* * * * *